US012493681B2

(12) United States Patent
Qureshi et al.

(10) Patent No.: US 12,493,681 B2
(45) Date of Patent: Dec. 9, 2025

(54) PUF-RAKE: A PUF-BASED ROBUST AND LIGHTWEIGHT AUTHENTICATION AND KEY ESTABLISHMENT PROTOCOL

(71) Applicant: Kansas State University Research Foundation, Manhattan, KS (US)

(72) Inventors: Mahmood Azhar Qureshi, Manhattan, KS (US); Arslan Munir, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 498 days.

(21) Appl. No.: 17/765,529

(22) PCT Filed: Sep. 30, 2020

(86) PCT No.: PCT/US2020/053467
§ 371 (c)(1),
(2) Date: Mar. 31, 2022

(87) PCT Pub. No.: WO2021/067392
PCT Pub. Date: Apr. 8, 2021

(65) Prior Publication Data
US 2022/0358203 A1    Nov. 10, 2022

Related U.S. Application Data

(60) Provisional application No. 63/073,527, filed on Sep. 2, 2020, provisional application No. 62/909,085, filed on Oct. 1, 2019.

(51) Int. Cl.
*G06F 21/44* (2013.01)
*G06F 21/73* (2013.01)
(Continued)

(52) U.S. Cl.
CPC ............. *G06F 21/44* (2013.01); *G06F 21/73* (2013.01); *H04L 9/3093* (2013.01); *H04L 9/3278* (2013.01); *G06F 2221/2103* (2013.01)

(58) Field of Classification Search
CPC ........ G06F 21/30; G06F 21/44; G06F 21/445; G06F 21/73; G06F 21/70; G06F 21/60;
(Continued)

(56) References Cited

U.S. PATENT DOCUMENTS

2010/0127822 A1    5/2010  Devadas
2011/0274193 A1*  11/2011  Yoon ...................... H04J 13/10
                                                              375/260
(Continued)

OTHER PUBLICATIONS

International Search Report and Written Opinion in corresponding PCT/US2020/053467, dated Mar. 12, 2021.
(Continued)

*Primary Examiner* — William R Korzuch
*Assistant Examiner* — Sayeda Salma Nahar
(74) *Attorney, Agent, or Firm* — Hovey Williams LLP

(57) ABSTRACT

Low-resource overhead computer-implemented methods for enrolling, authenticating and establishing encryption keys for one or more queried devices, each of the queried devices including an electrical circuit configured to output electrical signals indica-five of a physically unclonable function (PUF) of the queried device. Authentication and encryption are implemented in low-resource queried device computational architectures, with embodiments of the present invention utilizing pseudo-random number generators configured based on unique primitive polynomials, masking and unmasking functions, and error correction protocols executed in a querying device.

12 Claims, 9 Drawing Sheets

(51) Int. Cl.
*H04L 9/30* (2006.01)
*H04L 9/32* (2006.01)

(58) Field of Classification Search
CPC ........... G06F 2221/2103; H04L 9/3093; H04L 9/0869; H04L 9/0866; H04L 9/3278; H04L 9/32; H04L 9/3271; H04L 9/3273; H04L 63/1425
See application file for complete search history.

(56) References Cited

U.S. PATENT DOCUMENTS

| | | | |
|---|---|---|---|
| 2014/0140513 A1 | 5/2014 | BrightSky et al. | |
| 2014/0189890 A1 | 7/2014 | Koeberl et al. | |
| 2015/0171870 A1* | 6/2015 | Parker | H04L 9/0869 380/44 |
| 2018/0006830 A1 | 1/2018 | Cambou | |
| 2019/0349208 A1* | 11/2019 | Merchan | H04L 9/3278 |
| 2020/0412556 A1* | 12/2020 | Yoon | H04L 63/0876 |

OTHER PUBLICATIONS

Braeken, "PUF Based Authentication Protocol for IoT", Symmetry, 2018, 10, 352, 15 pages.

Halak, et al., "Overview of PUF-based hardware security solutions for the Internet of Things", IEEE 59th International Midwest Symposium on Circuits and Systems, 2016, 4 pages.

Suh, et al., "Physical Unclonable Functions for Device Authentication and Secret Key Generation", DAC, 2007, 6 pages.

\* cited by examiner

PUF-RAKE: A PUF-BASED ROBUST AND LIGHTWEIGHT AUTHENTICATION AND KEY ESTABLISHMENT PROTOCOL

CROSS-REFERENCE TO RELATED APPLICATIONS

The present application is the U.S. National Stage of International Patent Application No. PCT/US2020/053467, filed Sep. 30, 2020, which claims the benefit of and priority from the following U.S. Provisional Patent Applications: Ser. No. 62/909,085, filed Oct. 1, 2019, and entitled PUFRLA: A PUF-BASED RELIABLE AND LIGHTWEIGHT AUTHENTICATION PROTOCOL EMPLOYING BINARY STRING SHUFFLING; and Ser. No. 63/073,527, filed Sep. 2, 2020, and entitled PUF-RAKE: A PUF-BASED ROBUST AND LIGHTWEIGHT AUTHENTICATION AND KEY ESTABLISHMENT PROTOCOL, and the entire disclosure of each of the foregoing provisional applications is hereby incorporated by reference herein.

FIELD OF THE INVENTION

The present disclosure generally relates to computer-implemented methods, systems comprising computer-readable media, and electronic devices for authenticating a queried device. More particularly, the present disclosure generally relates to electronic devices for authenticating a queried device exhibiting physically unclonable functions (PUFs).

BACKGROUND

Existing authentication technologies may provoke a response from a device that reveals the device's physically unclonable functions (PUFs) in order to authenticate that device. The PUFs derive directly from the physically unclonable microstructure of the device as randomly introduced through manufacturing variations (e.g., metal resistivity and effective channel lengths of transistors), and act as a digital fingerprint for the device. For example, a silicon PUF may be based on hidden timing and delay information of integrated circuits, with a corresponding delay circuit including multiplexers and an arbiter for computing an output based on relative delay difference between two paths in the integrated circuit with the same layout length. For another example, a silicon PUF may be based on delay loops (ring oscillators) and counters.

However, current authentication technologies utilizing PUFs are vulnerable to modeling attacks in which multiple challenge-response pairs are exposed to the attacker and machine learning, linear programming and/or algebraic methods are used to model the device's PUFs. Further, such current technologies often require storage of sensitive information regarding how the queried device behaves in connection with authentication queries, increasing the risk that an attacker will be able to "hack" the authentication process. For instance, an enrollment process may include a large number of randomly chosen challenges posed to a queried device, with the responses being stored in a purportedly secure database. Thereafter, verification may be performed as needed by a querying device reusing each of the large number of random challenges a single time and confirming that each corresponding response matches the expected response stored in the database. Storage of challenges and responses in such a way may enhance the risk of breach. Still further, current technologies seeking to address one or more of these shortcomings often carry heavy hardware requirements for queried devices.

Embodiments of the present invention provide improved systems, devices and methods for device authentication. This background discussion is intended to provide information related to the present invention which is not necessarily prior art.

BRIEF SUMMARY

Embodiments of the present technology relate to improved computer-implemented methods, systems comprising computer-readable media, and electronic devices for authenticating an electronic device exhibiting physically unclonable functions (PUFs).

In a first aspect, a computer-implemented method for device authentication enrollment may be provided for enabling authentication of a queried device having a queried memory element, a queried processing element, a queried communication element, and an electrical circuit configured to output electrical signals indicative of a physically unclonable function (PUF) of the queried device. The computer-implemented method may include: storing a unique identification value at the queried device; generating a primitive polynomial unique to the queried device; generating a configuration file based at least in part on the unique primitive polynomial; programming the queried device for authentication based at least in part on the configuration file; generating a set of random numbers; submitting a challenge corresponding to each of the set of random numbers to the electrical circuit of the queried device to generate a PUF response; and storing the PUF response in a queried device database record accessible to a querying device. The method may include additional, less, or alternate actions, including those discussed elsewhere herein.

In another aspect, a computer-implemented method may be provided for authentication of a queried device having a queried memory element, a queried processing element, a queried communication element, and an electrical circuit configured to output electrical signals indicative of a physically unclonable function (PUF) of the queried device. The computer-implemented method may include: transmitting a unique identification value from the queried device to a querying device; via the querying device, retrieving a record corresponding to the queried device from a database, the record containing a PUF response of the electrical circuit of the queried device; at the queried device, generating a first random number and transmitting the first random number to the querying device; at the querying device, generating a second random number and transmitting the second random number to the queried device; at the queried device, using a masking function on the first random number to generate a masked first random number; at the querying device, using the masking function on the second random number to generate a masked second random number; at the querying device, using the masking function, masking the first random number received from the queried device; at the queried device, using the masking function, masking the second random number received from the querying device; at the querying device, generating a challenge based at least in part on a random number stored in connection with the retrieved record of the queried device; at the querying device, using the masking function, masking the challenge and the random number corresponding to the retrieved record; transmitting the masked challenge and the masked random number corresponding to the retrieved record from the querying device to the queried device; at the queried device, using an unmasking function corresponding to the masking function to unmask the masked challenge; at the queried device, using the unmasking function to unmask the masked random number corresponding to the retrieved record; at the queried device, using the unmasked challenge and the unmasked random number corresponding to the retrieved record to verify the querying device; at the queried device, based on the verification of the querying device, unlocking the electrical circuit of the queried device; at the queried device, generating a plurality of sub-challenges; at the queried device, feeding the plurality of sub-challenges to the electrical circuit of the queried device to generate a response; at the queried device, using the masking function, masking the response; transmitting the masked response from the queried device to the querying device; at the querying device, using the unmasking function, unmasking the masked response; at the querying device, making a comparison based at least in part on the unmasked response and the PUF response from the retrieved record to authenticate the queried device to the querying device. The method may include additional, less, or alternate actions, including those discussed elsewhere herein.

In still another aspect, a computer-implemented method may be provided for establishing encryption keys for use in communications between two or more queried devices, each queried device having a queried memory element, a queried processing element, a queried communication element, and an electrical circuit configured to output electrical signals indicative of a physically unclonable function (PUF) of the queried device. The computer-implemented method may include: generating a first original public key at the first queried device; generating a second original public key at the second queried device; at the first queried device, masking the first original public key; at the second queried device, masking the second original public key; transmitting the first masked public key and the corresponding first original public key from the first queried device to a querying device; transmitting the second masked public key and the corresponding second original public key from the second queried device to the querying device; at the querying device, unmasking the first and second masked public keys; at the querying device, masking the first original public key with a PUF response from the electrical circuit of the second queried device to generate a response-masked first public key; at the querying device, masking the second original public key with a PUF response from the electrical circuit of the first queried device to generate a response-masked second public key; transmitting the response-masked first public key and the first original public key from the querying device to the second queried device; transmitting the response-masked second public key and the second original public key from the querying device to the first queried device; at the first queried device, unmasking the response-masked second public key; at the second queried device, unmasking the response-masked first public key; at the first queried device, matching the second original public key to the response-unmasked second public key to accept the second original public key; at the second queried device, matching the first original public key to the response-unmasked first public key to accept the first original public key; at the first queried device, generating a first shared secret based at least in part on the acceptance of the second original public key; and, at the second queried device, generating a second shared secret based at least in part on the acceptance of the first original public key. The method may include additional, less, or alternate actions, including those discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

Figure 1:
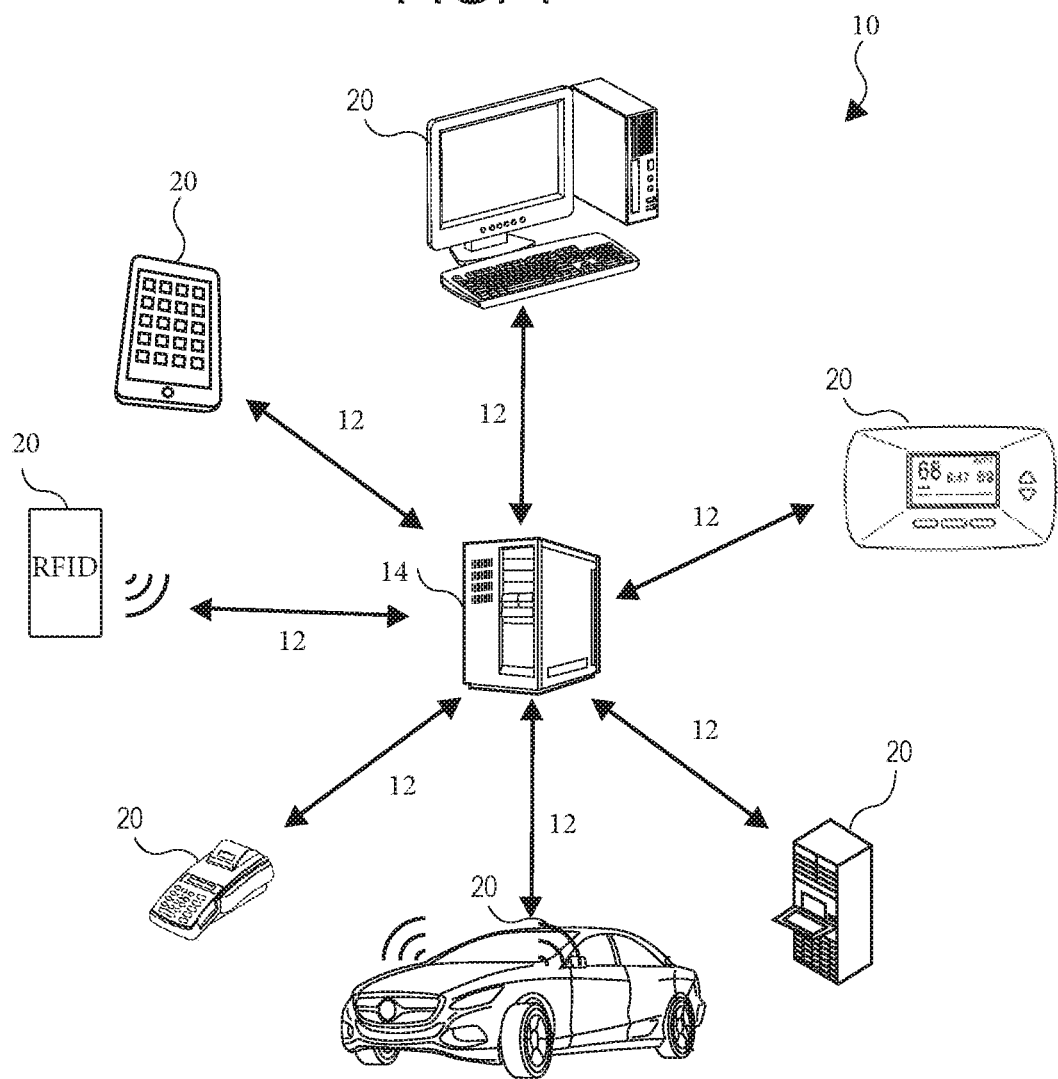
FIG. 1 illustrates in schematic form various components of an exemplary system for enrolling, authenticating and establishing public and private keys for communication between electronic devices exhibiting physically unclonable functions (PUFs), according to embodiments of the present invention.
Figure 2:
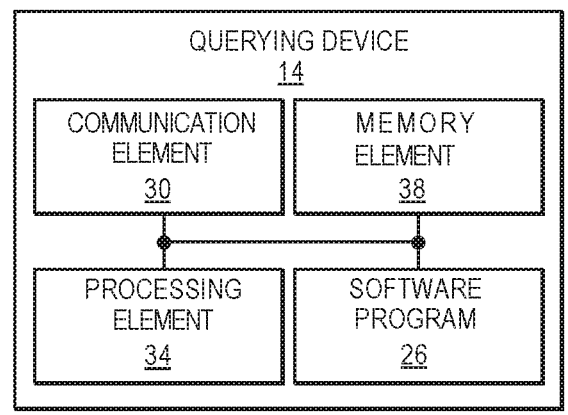
FIGS. 2 and 3 respectively illustrate in block schematic form various components of exemplary querying and queried devices that may be used with the system of FIG. 1.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

As outlined above, modern systems for authenticating a device based on such device's physically unclonable functions (PUFs) are susceptible to modeling and/or hacking attacks, at least because of the way(s) in which challenge-response pairs are stored and/or communicated between devices involved in the authentication process. Embodiments of the present invention provide stronger resilience against security attacks, particularly where the adversary can not only conduct passive or active attacks during an authentication phase, but may also breach a querying device that stores PUF information about a queried device and/or about the authentication process more generally. Further, preferred embodiments provide such enhanced resilience via one or more method(s) that may be implemented in a low-resource queried device computational architecture, permitting widespread use across a variety of queried devices.

In embodiments of the present invention described in more detail below, relationships between challenges and responses, and the challenges/responses themselves, are obscured and transformed to reduce or eliminate their value to an attacker that might breach a database of the querying device. For example, mere unauthorized access to the database of the querying device and to enrollment data needed for authenticating a queried device is insufficient to successfully model the queried device. For another example, in one or more embodiments, important values connected with the authentication process are masked prior to being exchanged by querying and queried devices over insecure communication channels. In this manner, preferred embodiments of the present invention do not require execution of hashing procedures by the queried devices, including during authentication processes, which reduces the required hardware overhead. For still another example, error correction procedures and data of embodiments of the present invention may reside partly or completely in the querying device, reducing hardware overhead requirements for the queried device(s).

In addition, a robust control logic is exerted over access to a PUF circuit of the queried device, requiring a correct input message be applied for access to the PUF circuit. Moreover, in a preferred embodiment, attempted entry of a pre-determined number of incorrect input message(s) will automatically trigger a refusal of access to the PUF circuit by the queried device unless and until an unlocking event occurs or an unlocking code is presented. These features introduced by the control logic outlined herein reduce the need for non-linearities in the PUF circuit of the queried device which, in turn, improves accuracy over prior art systems.

Specific embodiments of the technology will now be described in connection with the attached drawing figures. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Exemplary System

FIG. 1 depicts an exemplary environment in which embodiments of a system 10 may be utilized for authenticating one or more electronic devices, each exhibiting physically unclonable functions (PUFs). One of ordinary skill will appreciate that, while certain PUFs may be more conducive to lightweight implementation, any of a variety of electrical circuits may be configured to output electrical signals indicative of PUFs such as, for instance: a delay PUF; a static random-access memory PUF; a metal resistance PUF; a bistable ring PUF; a dynamic random access memory PUF; a digital PUF; an oxide rupture PUF; a coating PUF; a quantum electronic PUF; an optical PUF; a quantum optical PUF; a magnetic PUF; or a radio frequency PUF.

The environment may include communication links 12 for enabling electronic communications between components of the system 10. The system 10 may include a querying device 14 and one or more queried devices 20. The querying device 14 may manage enrollment of the queried devices 20 for authentication processes, as described in more detail below. Further, the querying device 14 may also manage real-time authentication of queried device(s) 20 following enrollment, also as described in more detail below. Still further, the querying device 14 may also manage establishment of public and private encryption keys for use in communications between two or more of the queried devices 20 and/or the querying device 14. One of ordinary skill will appreciate, however, that enrollment and subsequent authentication and key establishment functions may be performed by different physical computing devices, though they are described herein as being performed by the same querying device 14 for ease of reference.

Queried devices 20 may be utilized across a variety of industries, including complex infrastructure and cyber-physical systems spanning different domains such as medical, defense, transportation, agriculture, and automation. The applications requiring secure data transmission include Internet of things (IoT), in-vehicle network communication in self-driving cars, vehicle-to-vehicle (V2V), vehicle-to-infrastructure (V2I) communication, smart grid communication, and many more. In one or more embodiments, status information about IoT embodiments of the queried devices 20 may be continuously or periodically recorded and transmitted pursuant to the authentication and encryption key establishment protocols set forth herein.

In a preferred embodiment, the queried devices 20 may be low-resource electronic devices (e.g., simple Internet of things (IoT) devices, radio frequency identification (RFID) tags, or the like). Consequently, preferred embodiments present improved and relatively lightweight protocols that may be implemented with correspondingly lightweight computational architectures, discussed in more detail below. However, higher-level computational architectures and hardware of devices such as smartphones, laptop computers or the like may comprise queried devices 20, and may be authenticated and/or participate in encrypted exchanges using the system 10, without departing from the spirit of the present invention.

Each queried device 20 may optionally execute an authentication and encryption program 22, as described in more detail below, for managing at least some of the steps of embodiments of the present invention exemplified in FIGS. 4-5 hereof. Likewise, the querying device 14 may execute a querying device program 26 for managing at least some of the steps for enrollment, authentication and key establishment for queried devices 20 set out in FIGS. 4-5.

Broadly, the communication links 12 may allow communication between the queried devices 20 and the querying device 14 and/or between queried devices 20. One or more of the communication links 12 may include or comprise local area networks, metro area networks, wide area networks, cloud networks, the Internet, cellular networks, plain old telephone service (POTS) networks, and the like, or combinations thereof. The communication links 12 may be wired, wireless, or combinations thereof and may include components such as modems, gateways, switches, routers, hubs, access points, repeaters, towers, and the like. For example, the queried devices 20 may generally connect to the communication links 12 and/or to the querying device 14 wirelessly, such as radio frequency (RF) communication using wireless standards such as cellular 2G, 3G, 4G, or 5G, Institute of Electrical and Electronics Engineers (IEEE) 802.11 standards such as WiFi, IEEE 802.16 standards such as WiMAX, Bluetooth®, or combinations thereof. Also or alternatively, the queried devices 20 may generally connect to the communication links 12 and/or to the querying device 14 via Bluetooth® wireless communication protocol in general, or the Bluetooth® low energy (BLE) protocol. In one or more embodiments, communication links 12 may be secured in connection with communications exchanged between queried devices 20 and the querying device 14 during enrollment procedures, but may be unsecure in connection with communications exchanged between queried devices 20 and the querying device 14 during authentication and/or key establishment procedures. "Secured" may generally refer to implementation of one or more of encryption protocols, additional authentication protocols, data expiration or the like and/or to utilizing air gaps, air walls, air gapping, disconnected networks and/or the like to enhance security of electronic communications.

The querying device 14 generally retains electronic data and may respond to requests to retrieve data as well as to store data. The querying device 14 may be embodied by application servers, communication servers, database servers, file servers, gaming servers, mail servers, print servers, web servers, or the like, or combinations thereof. Furthermore, the querying device 14 may include a plurality of servers, virtual servers, or combinations thereof. The querying device 14 may be configured to include or execute software such as file storage applications, database applications, email or messaging applications, web server applications, or the like, in addition to and/or in conjunction with the querying device program 26.

The querying device 14 may apply business methods or algorithms, may utilize and/or manage lookup tables or databases, receive user input via one or more peripheral devices or associated systems, or perform other tasks. The querying device 14 may perform tasks in order to enroll, authenticate and/or establish public and private encryption keys for queried devices 20, and/or to perform other tasks outlined throughout this disclosure.

The querying device 14 may further include a communication element 30, a processing element 34, and a memory element 38.

Figure 3:
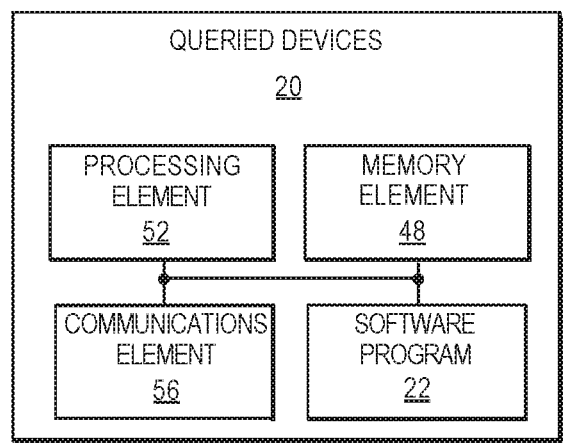

One or more of the queried devices 20 may be embodied by a radio frequency identification (RFID) tag, an access control badge or the like, a medical device, a data cloud and/or data center computer, a smart watch, a smart phone, a personal digital assistant (PDA), a tablet, a palmtop or laptop computer, a notebook, a netbook, smart glasses, wearable and non-wearable electronics (e.g., any IoT device), or other mobile device. Each queried device 20 may include a memory element 48, a processing element 52, and a communications element 56, as seen in FIG. 3. The memory element 48 may store the software program 22, and the processing element 52 may execute the software program 22. The queried devices 20 may also generally include electrical power sources housed in small boxes or packages for powering the components thereof outlined herein.

The communication elements 30, 56 may allow communication between one another and/or with external systems or devices. The communication elements 30, 56 may include signal or data transmitting and receiving circuits, such as antennas, amplifiers, filters, mixers, oscillators, digital signal processors (DSPs), and the like. The communication elements 30, 56 may establish communication wirelessly by utilizing RF signals and/or data that comply with communication standards such as cellular 2G, 3G, 4G, or 5G, IEEE 802.11 standard such as WiFi, IEEE 802.16 standard such as WiMAX, Bluetooth®, or combinations thereof. Alternatively, or in addition, the communication elements 30, 56 may establish communication through connectors or couplers that receive metal conductor wires or cables which are compatible with networking technologies such as ethernet. In certain embodiments, the communication elements 30, 56 may also couple with optical fiber cables. The communication elements 30, 56 may be in communication with or electronically coupled to memory elements 38, 48 and/or processing elements 34, 52.

The memory elements 38, 48 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory elements 38, 48 may include, or may constitute, a "computer-readable medium." The memory elements 38, 48 may store the instructions, code, code segments, software, firmware, programs, applications, apps, services, daemons, or the like that are respectively executed by the processing elements 34, 52. The memory elements 38, 48 may comprise non-volatile memory areas for storing programs 26, 22. The memory elements 38, 48 may also store settings, data, documents, sound files, photographs, movies, images, databases, and the like. For example, the memory element 38 may store and maintain a database, and the memory element 48 may comprise non-volatile memory configured to store one or more values discussed in more detail below. (See also FIG. 4)

The processing elements 34, 52 may include processors. The processing elements 34, 52 may include microprocessors, microcontrollers, DSPs, field-programmable gate arrays (FPGAs), analog and/or digital application-specific integrated circuits (ASICs), or the like. The processing elements 34, 52 may include digital processing unit(s). The processing elements 34, 52 may include combinations of any of the foregoing. The processing elements 34, 52 may generally execute, process, or run instructions, code, code segments, software, firmware, programs, applications, apps, processes, services, daemons, or the like. The processing elements 34, 52 may also include hardware components, such as finite-state machines, comparators, sequential and combinational logic, and other electronic circuits that may perform the functions necessary for the operation of embodiments of the current inventive concept. The processing elements 34, 52 may be in communication with the other electronic components through serial or parallel links that include address busses, data busses, control lines, and the like.

Exemplary Low-Resource Computational Architecture

Figure 4A:
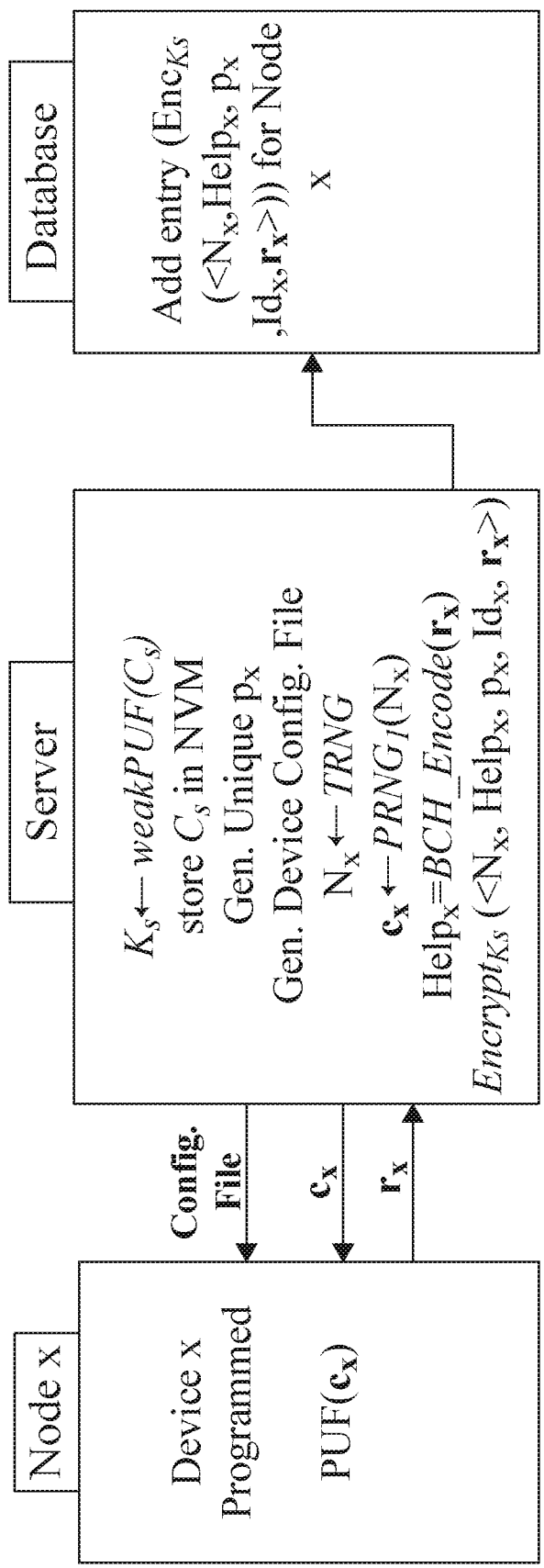
FIG. 4A is a flowchart of various logical components of an exemplary system for enrolling an electronic device exhibiting PUFs for authentication, and of relationships and information flows between the components, in accordance with embodiments of the present invention.
Figure 4B:
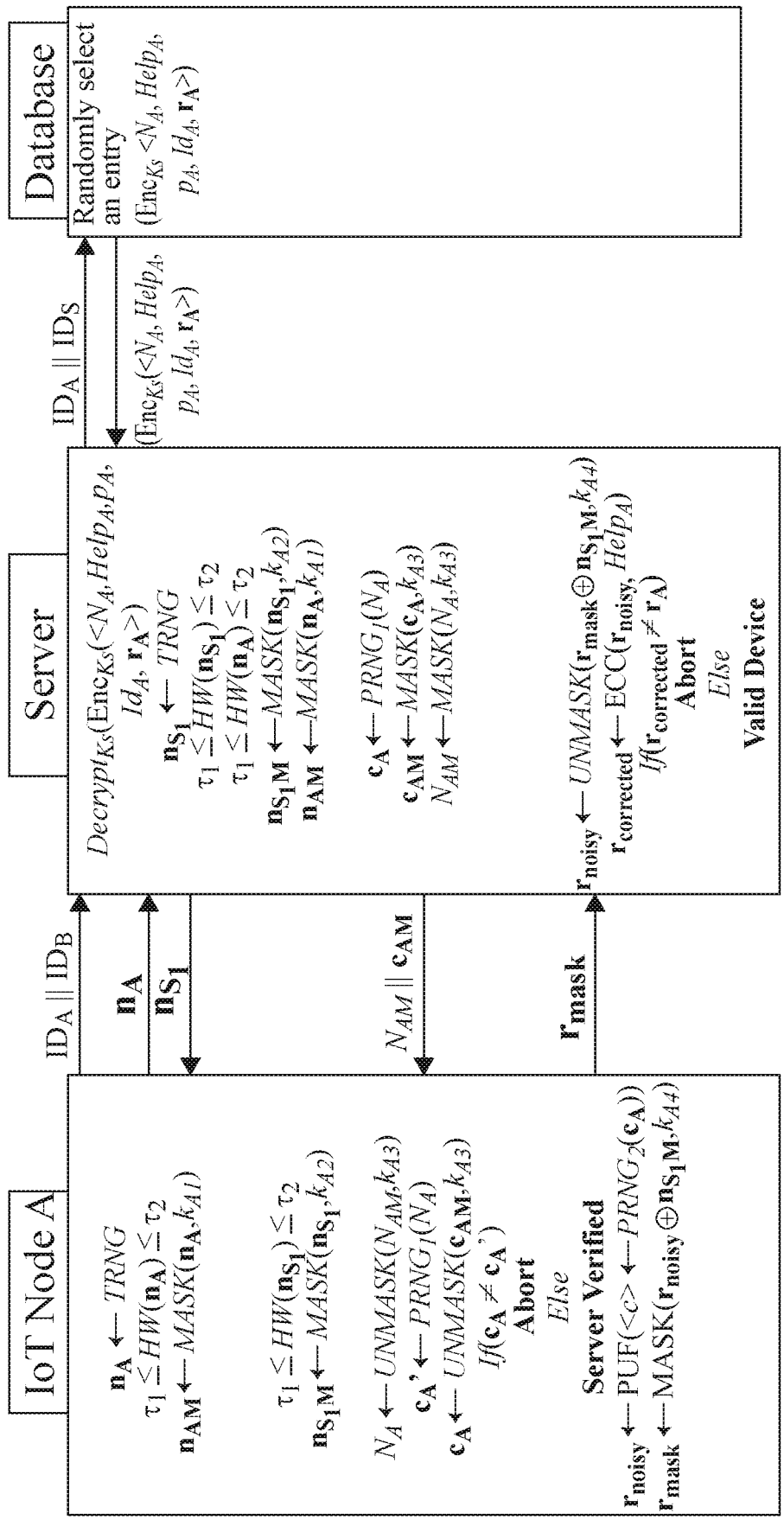
FIG. 4B is a flowchart of various logical components of an exemplary system for authenticating an electronic device exhibiting PUFs, and of relationships and information flows between the components, in accordance with embodiments of the present invention.
Figure 4C:
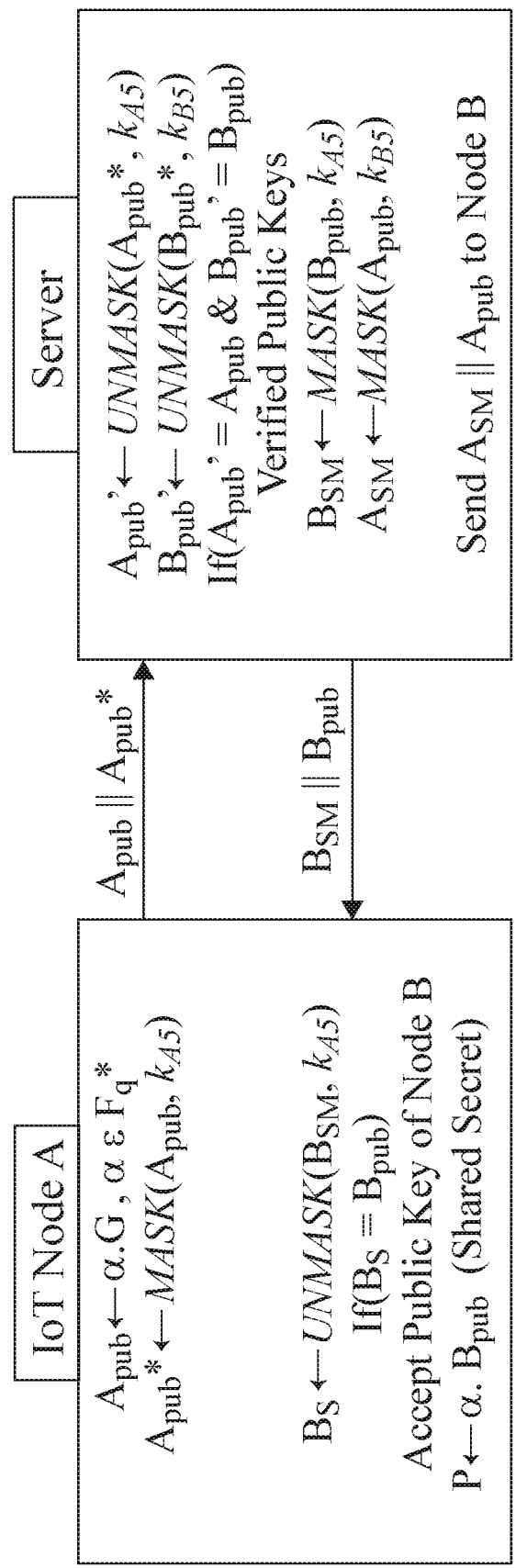
FIG. 4C is a flowchart of various logical components of an exemplary system for establishing public and private encryption keys for use in communications between two or more queried devices exhibiting PUFs, and of relationships and information flows between the components, in accordance with embodiments of the present invention.

Turning briefly to FIGS. 4A, 4B and 4C, processes for implementation on a lightweight computational architecture of preferred embodiments of the present invention are illustrated. A querying device may be embodied by a server (as illustrated in the exemplary embodiment) or other computing device configured to enroll, authenticate and/or establish public and private encryption keys for one or more queried devices. For instance, all or some of the illustrated functional aspects of the querying device may be implemented within a querying device 14 (see FIG. 1). Similarly, a queried device (also referred to herein as a "node" or an "IoT Node" in preferred embodiments) may be embodied by any of the electronic devices outlined hereinabove including, without limitation, by a radio frequency identification (RFID) tag, access control badge or the like, medical device, data cloud and/or data center computer. Again, all or some of the illustrated functional components of the queried device may be implemented within a queried device 20 (See FIG. 1). However, one of ordinary skill will appreciate that multiple devices may implement the illustrated functional aspects, and that such functional aspects may be distributed differently among such querying and queried device(s), without departing from the spirit of the present invention.

Turning now to the illustrated querying device, the querying device may embody and/or access a database (e.g., embodied in non-volatile memory spaces (NVM)) for storing records, each record comprising an entry containing data elements discussed in more detail below. As will be discussed in more detail below, the data elements may be stored in various forms to enhance security benefits outlined above. Moreover, one of ordinary skill will appreciate that, while the database of FIG. 4 may be embodied in a common tabular format with columns and rows, any of various types of database structures may be implemented within the scope of the present invention. For instance, data structures for storing relationships between and/or indexing entries containing data elements of each group or record may be embodied within other relational and/or object-oriented databases without departing from the scope of the present invention.

Other logical components associated with the querying device may include code segments for querying, encryption, and authenticity determination functions described in more detail below. It should be noted again here that, in a preferred embodiment, all or some of these logical components or code segments may be subsumed by or embodied within the software program 26 of the querying device 14. It should also be noted that embodiments of the present invention may omit one or more of such code segments (e.g., the encryption function) without departing from the spirit of the present invention.

Turning now to the illustrated queried device, the queried device may embody and/or access NVM or another memory element for one or more value(s) discussed in more detail below. Other logical components associated with the queried device and/or the querying device may include hardware and/or code segments for: control logic for operation of the queried device and access to the PUF circuit; sub-challenge submission, PUF circuit response (see PUF) and weak PUF response in the querying device (weakPUF); random number generation (i.e., via true random number generators (TRNGs), pseudo random number generator one ($PRNG_1$) and pseudo random number generator two ($PRNG_2$)); performing lightweight challenge-response pair (CRP) obfuscation via bit shuffling and bitwise XOR operations (XORing); performing masking and unmasking functions described in more detail below (MASK and UNMASK functions); and other functions described in more detail below. It should be noted again here that, in a preferred embodiment, all or some of these logical components or code segments may be subsumed by or embodied within the software programs 22, 26 of the devices 20, 14. It should also be noted that embodiments of the present invention may omit one or more of such code segments without departing from the spirit of the present invention.

In embodiments of the present invention, PRNGs may comprise linear feedback shift register (LFSR) based pseudo-random number generators for deterministic generation of numbers from seed values. LFSR PRNGs require low hardware overhead and provide nearly uniform statistical outputs. One of ordinary skill will appreciate that other deterministic PRNGs may be utilized without departing from the spirit of the present invention. Preferably, any such PRNG optimizes factors such as linearity, circularity and predictability. Exemplary PRNGs set out herein include $PRNG_1$—used in MASK operations and $c_A$ generation—and $PRNG_2$—used generate <c>. Additional details regarding exemplary PRNGs and the variables introduced here are set out below.

Further, in one or more embodiments, a weakPUF may comprise a PUF electrical circuit of the querying device used for generation of an encryption key for encrypting and decrypting records generated during enrollment.

Still further, in one or more embodiments, the TRNGs may each be circuit- or software-based, and non-deterministic in their output. The TRNGs may, for example, be used by the queried device in generation of a private key a and in executing other functions discussed in more detail below.

Exemplary Methods for Authentication of and Key Establishment for a Queried Device FIGS. 5A-D depict a listing of steps of exemplary computer-implemented methods 500 for enrolling, authenticating and establishing encryption keys for queried device(s). Some steps may be performed concurrently as opposed to sequentially, and may in some cases be performed in a different order. In addition, some steps may be optional. The computer-implemented method(s) 500 are described below, for ease of reference, as being executed by exemplary devices and components introduced with the embodiments illustrated in FIGS. 1-4. For example, the steps of the computer-implemented method(s) 500 may be performed by the querying device 14, and at least in part by the queried devices 20, and/or communication links 12 through the utilization of processors, transceivers, hardware, software (such as the software applications 22, 26 described herein), firmware, or combinations thereof. In one or more embodiments, the steps set out below for a single queried device are substantially repeated in connection with enrollment, authentication and/or establishment of encryption keys for all other queried devices. A person having ordinary skill will also appreciate that responsibility for all or some of such actions may be distributed differently among such devices or other computing devices without departing from the spirit of the present invention.

One or more computer-readable medium(s) may also be provided. The computer-readable medium(s) may include one or more executable programs, such as a queried device program and a querying device program, stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Notations

For ease of illustration herein and in the attached drawings, the examples and nomenclature set out below generally adhere to the following rules unless a contrary intent is evident.

Binary vectors (V), that is, $V \in \{0, 1\}^n$, are represented by lower case, bold alphabets such as r, x etc. $\oplus$ is used for bit-wise XOR, whereas $\parallel$ is used to refer to two (2) concatenated vectors. Function names are italicized, upper case alphabets and can accept n number of arguments; e.g., $MAP(k_1, k_2, k_3, \ldots, k_n)$ represents a function MAP accepting n arguments. Functions can also accept other functions as arguments. In such functions, the argument function is evaluated first and the result is used in the main function; e.g., $MAP_2(FUN_1(l_1),FUN_2(l_2))$ evaluates $FUN_1(l_1)$ and $FUN_2(l_2)$ first and uses the results to evaluate $MAP_2$. <·> represents an indexed list.

Assuming c is an n-bit binary vector, then <c> represents a list of m n-bit binary vectors generated from c, where, m, $n \in Z^+$. |r| represents the length of the binary vector r. HW(r) computes the hamming weight, that is, the number of ones in the binary vector r. HW for an n-bit binary string x can be calculated by the following equation:

$$\mathcal{HW}(x) = \sum_{i=0}^{n-1}(x[i] \oplus 0)$$

Masking Function

Operations discussed in more detail below may utilize a masking function (MASK) such as the exemplary function discussed here. One of ordinary skill will appreciate that other masking functions may be utilized without departing from the spirit of the present invention.

Given a binary l length input vector $r=[r_1, r_2, r_3, \ldots, r_l]$, the MASK function applies a transformation $\Omega(r)$ using a set of l integers, to produce an l length output vector $r_m$, comprising a random combination of the elements in r. Similarly, the MASK function can also be used in a reversible transformation $\Omega^{-1}(r_m)$ (i.e., UNMASK) using the same set of l integers to produce the original vector r. These transformations can be represented respectively as:

$MASK(r,K): r \Rightarrow r_m$ $UNMASK(r_m,K): r_m \Rightarrow r$

In the above equations, $K=k_1, k_2, k_3, \ldots, k_l | k \in Z^+$ is a set of l positive integers. In one or more embodiments, for MASK(r, K), the length of binary input vector r is equal to the number of elements in K. Similarly, the UNMASK function may be used in the same manner as MASK, but using input $r_m$ to regenerate r.

Both the MASK and UNMASK functions may generate random binary output vectors which have no correlation to input vectors. Performing a masking operation may: 1) effectively hide relationship(s) between CRPs of a queried device's PUFs; and 2) provide a verification of an input stream to the queried device, as discussed in more detail below. In one or more embodiments, without validating the input stream, the PUF is not activated and no response is generated by the queried device, effectively mitigating risks of brute force attacks on the queried device.

The masking operation may include three main components: PRNG, range adjuster and a bit shuffler. In a preferred embodiment, the PRNG circuit uses an m-bit register and the total number of look-up tables (LUTs) equals the number of feedback taps representing a primitive polynomial. The range adjuster uses one multiplier. The bit shuffler may be implemented using a dual port BRAM primitive in a field-programmable gate array (FPGA). The BRAM has independent read-write address ports. The input data to be shuffled is first written into the BRAM in binary. Thus, the space complexity of BRAM for an m-bit input data is only O(m). The output from the range adjuster is used as the read address and a decrementing counter is used as the write address of the BRAM. In this manner, the for loop of the exemplary MASK algorithm outlined below is implemented in hardware. Bit swapping is done during each clock cycle until the decrementing counter goes from m to 0.

An exemplary MASK function takes two input arguments: an m-bit binary vector x to be masked and an integer set K. As discussed in more detail below, K is generated using $PRNG_1$ as $(K\ PRNG_1(y))$, where y is an n-bit binary vector. Thus, by definition, the masking function may also be written as MASK(x,y) which takes two binary vectors (an m-bit x and an n-bit y) as inputs and outputs an m-bit binary vector $x_m$ which is a random combination of the elements (or bits) in x. it should be noted that "combination" and "permutation" may be used interchangeably in describing this embodiment.

In connection with integer set generation, the binary vector y is used as a seed to a PRNG circuit ($PRNG_1$) to generate a set of positive integers $\{k|k-Z^+\}$. The number of elements in the set are equal to m. All the integers in the integer set K are treated as n-bit positive numbers, where the maximum value that any integer can have is $2^n-1$.

In connection with range transformation, a function RANGE may be defined as a linear mapping transformation which, given an m-bit integer ($k \in K$), with the value in the range $[0,2^m-1]$, generates a new set $Q\{q|\in Z^+\}$ of l-bit integers in the range $[0,2^l-1]$, where $l \le m$. The linear range mapping is governed by the equation below:

$$N_{new} = \left\lfloor \frac{(N_{old} - N_{oldMin}) \times (N_{newMax} - N_{newMin})}{(N_{oldMax} - N_{oldMin})} \right\rfloor$$

In the equation above, $N_{old} \in K$ is an input to the RANGE function. $N_{oldMin}$ is the minimum and $N_{oldMax}$ is the maximum value in the old range $[0,2^m-1]$, which in this case are 0 and 2m-1, respectively. $N_{newMax}$ and $N_{newMin}$ are the maximum and minimum values in the new range $[0,2^l-1]$. For purposes of this exemplary description, the $N_{newMin}$ remains a constant 0, whereas $N_{newMax}$ can vary and is provided as the second input to the RANGE function. Accordingly, the updated version of the equation above is as follows:

$$N_{new} = \frac{(N_{old} \times N_{newMax})}{N_{oldMax}}$$

Because $N_{oldMax}$ is in powers of two (2), the equation may be further reduced by performing a simple right shift operation instead of division to conserve hardware resources. A finalized version of the equation above is set out below:

$N_{new}=N_{old} \times N_{newMax}) >> m$

The final step of the MASK function is bit shuffling. An exemplary shuffling algorithm for use in connection with embodiments of the present invention is based on Durstenfeld version of Fisher-Yates Shuffler. For a list of n distinct elements, the Durstenfeld shuffler produces n! permutations, all of which are equally likely.

The operations of an exemplary MASK algorithm are as follows:

Input: (x,y): m-bit binary vector x, n-bit binary vector y
Output: $x_m$: m-bit binary vector

```
1:     procedure MASK(x,y)
2:       Integer Set K: {k₁, k₂, ..., k_m} ← PRNG₁(y)
3:       for i ← 1 to m do
4:         N_new ← RANGE(k_i, m + 1 − i)
5:         x ← SWAP(x_Nnew, x_{m−i+1})
6:         x_m ← x
7:       end for
8:     end procedure
```

Summarizing the MASK function in terms of the exemplary algorithm above, it can be seen that the Durstenfeld shuffler shuffles the data in-place, meaning that the m-bit binary vector x can also be used as output at the end of the algorithm execution. For the sake of simplicity, the m-bit binary vector $x_m$ may be used as output. It is also evident from the exemplary algorithm that the output $x_m$ may be unmasked and transformed back to x by performing UNMASK($x_m$,y), otherwise formulated: x=UNMASK (MASK(x,y),y). For the case of UNMASK, the same integer set {$k_1, k_2, \ldots, k_m$} may be used, though the loop is iterated in reverse, that is, from m to 1.

Implementation of the MASK and UNMASK functions will be discussed in more detail below.

PRNG Design

Many of the variables discussed in this section are introduced in more detail in connection with the description of the exemplary methods that follow.

LFSR-based PRNGs are utilized in embodiments of the present invention at least in part because of their low hardware overhead and nearly uniform statistical outputs. Some important properties of PRNGs to look for during the design phase are linearity, circularity and predictability. Two LFSR-based PRNGs are used in exemplary methods outlined herein. $PRNG_1$ is used in both the MASK operation as well as the $c_A$ generation discussed below. $PRNG_2$ is used for <c> generation discussed in more detail below. Both of the LFSRs may be maximum-length LFSRs, having states.

Turning to configuration of one or more PRNGs utilized in embodiments of the present invention, and as noted above, the preferred feedback polynomial—extended over the finite field GF (2)—is primitive. The LFSR is initialized with a given seed $s_0$ and it cycles through $2^{|s_0|}-1$ states. Lock-up state—that is, all-zeros state—is avoided by design for an XOR-based LFSR. Further, all-ones state is avoided for an XNOR-based LFSR. The discussion here will focus on $PRNG_1$, which is unique for each of the queried devices and is used with the MASK function.

For an m-bit minimum length LFSR and a prime power n, the total number of primitive polynomials, $t_q(m)$, over GF(q) are given by:

$$t_q(m) = \frac{\phi(q^m - 1)}{m}$$

where the Euler's totient function is:

$$\phi(m) = \prod_{i=1}^{n}\left(P_i^{e_i} - P_i^{e_i-1}\right)$$

It may be assumed that m has a canonical factorization such that $m = p_1^{e_1} p_2^{e_2} \ldots p_n^{e_n}$ for a prime p and $n \in \mathbb{Z}^+$. By, for example, choosing a $PRNG_1$ of length m=64, there are approximately $10^{18}$ unique polynomials. Thus, more than a quadrillion devices may be enrolled in authentication systems according to embodiments of the present invention.

The seed value or iv for $PRNG_1$ during the process of masking is defined as $s_0 = iv \| n'_x$. Thus, equations for integer sets $k_{A1}$ through $k_{A5}$ discussed in more detail below are expanded as $PRNG_1(n_x) = LFSR(iv \| n'_x)$. Here, $|s_0| = m$, where m is the length of the binary vector $n_x$, inputted to the MASK function. Thus, both the iv and n'x are m/2 in length. Choice of $n'_x$ may be pre-determined (i.e., as determined during a design phase). Any m/2 bits can be chosen from $n_x$ during an authentication cycle and used as a part of the seed to the LFSR. It should be noted, however, that both the querying device and the queried device preferably agree upon a common choice of $n'_x$, to avoid cases in which the masked outputs are different.

The output of $PRNG_1$ is used by the RANGE function discussed above, which generates integers with a decreasing range. If m integers are generated by the PRNG, that is, ($k_1, k_2, k_3, \ldots, k_m$), then, during the first iteration, the range is between (1,m), inclusive. During the second iteration, the range is from (1,m−1), inclusive, and so on. This implies that during the first iteration, every number in the range (1,m) is equally probable and has the probability 1/m. Similarly, for the second iteration, with range (1,m−1), every number has the probability 1/(m−1), and so on. Keeping this observation in mind, an m×m Probability Matrix (PM) may be developed to map range adjusted PRNG outputs to their exact probability of occurrences for successive iterations of the MASK algorithm.

$$\begin{bmatrix} 1 & 2 & 3 & \ldots & m \\ 1 & 2 & 3 & \ldots & m \\ 1 & 2 & 3 & \ldots & m \\ \vdots & & \ddots & & \\ 1 & 2 & 3 & \ldots & m \end{bmatrix} \Rightarrow P_M$$

$$P_M = \begin{bmatrix} 1/m & 1/m & \ldots & 1/m & 1/m \\ 1/(m-1) & 1/(m-1) & \ldots & 1/(m-1) & 0 \\ 1/(m-2) & 1/(m-2) & \ldots & 0 & 0 \\ \vdots & & \ddots & & \vdots \\ 1/2 & 1/2 & \ldots & 0 & 0 \\ 1 & 0 & \ldots & 0 & 0 \end{bmatrix}$$

The first chart above represents the mapping of the range-adjusted PRNG outputs ($k_1, k_2, k_3, \ldots, k_m$). $k_1$ is any number in the range (1,m) represented by the first row in $N_R$. All the numbers in the first row are equally probable by nature of the algorithm and thus, mapped to the probability 1/m in $P_M$. Thus, first row of $N_R$ and $P_M$ represents the first iteration of the exemplary masking algorithm set forth in the previous section. During the second iteration, the range is (1,m−1), and thus, all the elements other than the $m^{th}$ are equally probable with the probability 1/(m−1). In the last iteration, since the range is (1, 1), 1 has the probability of 1 and all other numbers in $N_R$ have a 0 probability of occurrence.

Assuming that the exemplary MASK algorithm set out above runs k times, each time with m iterations, the probability matrix ($P_M$) can be used to calculate the expected outcome matrix ($E_M$) as: $E_M = k \times P_M$. Here, $E_M$ maps the numbers in $N_R$ to their expected occurrence. For m=10 and k=100, every number from (1,m) should ideally occur k=m=10 times during the first run of the algorithm. Similarly, every number from (1,m−1) should occur k/(m−1)≈11 times in the second iteration, and so on. A PRNG design which produces an Actual Outcome Matrix ($A_M$), close to $E_M$, after running k iterations, will provide highly unbiased inputs to the shuffler in the MASK function. The relationship is said to be "close" because, if the PRNG produces $A_M$ exactly like $E_M$ (i.e., there is no deviation between the expected and the observed values) then one might question the randomness of the PRNG.

Enrollment

The steps set out herein generally correspond to the flowchart illustrated in FIG. 4A.

Figure 5A:
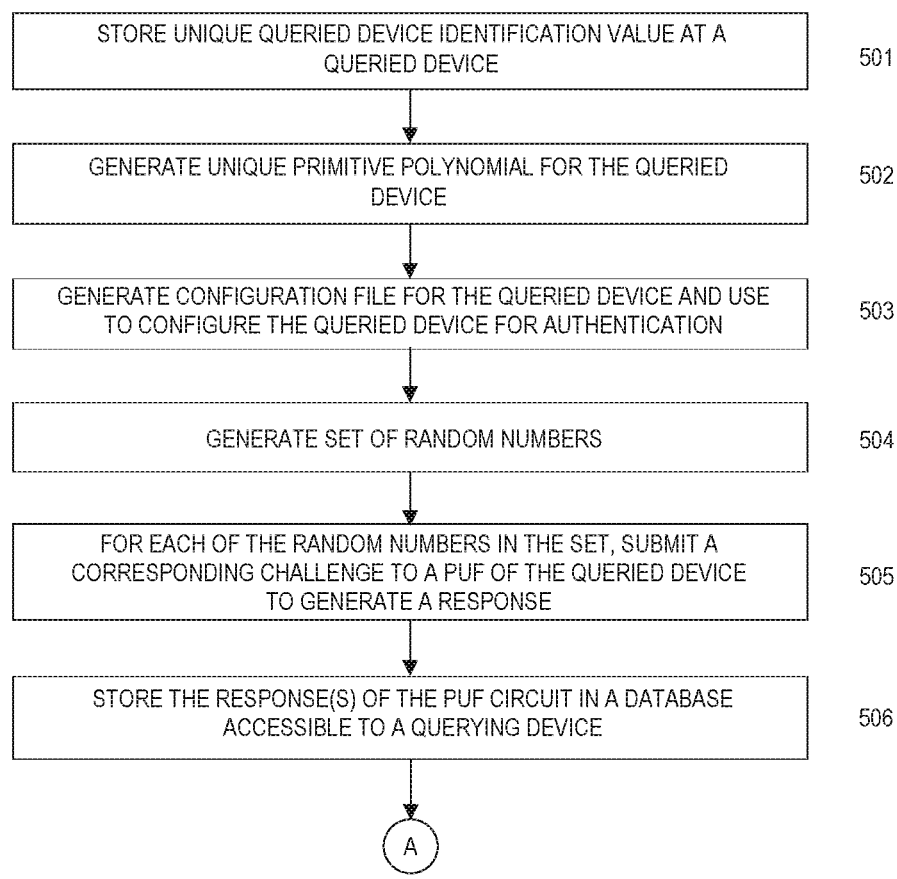
FIGS. 5A, 5B, 5C and 5D illustrate at least a portion of the steps of one or more exemplary computer-implemented method(s) for enrolling, authenticating and establishing public and private encryption keys for one or more electronic device(s) exhibiting PUFs according to embodiments of the present invention.

Referring to step 501 of FIG. 5A, a unique queried device identification value may be stored at the queried device. In an embodiment, the queried device identification value ($ID_t$) is generated by the querying device, and may comprise a unique alphanumeric string or other symbol or group of symbols capable of distinguishing the queried device from other queried device(s) at the desired level of abstraction, individual and/or group identity. $ID_t$ may, in one or more embodiments, be generated by the querying device and transmitted securely to the queried device. In one or more embodiments, the unique queried device identification value is stored at or in a database accessible to the querying device.

One of ordinary skill will appreciate that a different method for identifying a queried device, or no method at all, may be employed without departing from the spirit of the present invention.

Referring to step 502 of FIG. 5A, a unique primitive polynomial may be generated for the queried device. In one or more embodiments, the unique primitive polynomial ($p_t$) is unique to the queried device. The unique primitive polynomial ($p_t$) may be generated by the querying device.

Referring to step 503 of FIG. 5A, a configuration file may be generated and used to at least partly configure the queried device for authentication. In one or more embodiments, generating the configuration file may include generating $PRNG_1$ using the unique primitive polynomial ($p_t$).

In one or more embodiments, the configuration file is generated by the querying device and transmitted to and/or applied to the queried device. For example, the querying device may program the queried device for enrollment, authentication and/or key establishment functions described herein at least in part based on the configuration file. In one or more embodiments, this includes storing and/or configuring another instance of $PRNG_1$ in the NVM of the queried device.

Referring to step 504 of FIG. 5A, a set of random numbers may be generated. In one or more embodiments, the TRNG of the querying device is used to generate a set $N_x$ of k random numbers (RN). The magnitude of k corresponds to the total number of CRPs to be made available for authentication.

Referring to step 505 of FIG. 5A, for each of the random numbers in the set, a corresponding challenge may be submitted to the PUF of the queried device to generate a response. For example, in one or more embodiments, challenges ($c_x$) are generated by the querying device or the queried device using $PRNG_1$ with the RNs ($N_x$) as seeds or inputs. The challenges ($c_x$)—where generated by the querying device—or RNs ($N_x$)—wherever the challenges ($c_x$) are generated at the queried device—may be transmitted continuously upon generation, intermittently and/or in batches to the queried device. The queried device may use the challenges ($c_x$) as seeds or inputs to $PRNG_2$ to generate corresponding sub-challenges for submission to the PUF electrical circuit of the queried device.

Likewise, the corresponding PUF circuit responses ($r_x$) from the queried device may be transmitted to the querying device continuously upon generation, intermittently and/or in batches.

Referring to step 506 of FIG. 5A, the responses of the PUF circuit of the queried device are stored in one or more records of the database of and/or that is accessible to the querying device.

In a preferred embodiment, enrollment also includes operations supporting error correction in the querying device. More particularly, the querying device may generate help data ($Help_i$) associated with each response ($r_i$) of the PUF circuit. The help data ($Help_i$) may be generated using each response ($r_i$) as input for a Bose-Chaudhuri-Hocquenghem (BCH) encoding function (BCH Encode). BCH codes form a class of cyclic error-correcting codes that are constructed using polynomials over a finite field (also called Galois field). One of the key features of BCH codes is that during code design, there is a precise control over the number of symbol errors correctable by the code. In particular, binary BCH codes may be designed that correct multiple bit errors. Another advantage of BCH codes is the ease with which they can be decoded, namely, via an algebraic method known as "syndrome decoding." This simplifies the design of the decoder for these codes, using small low-power electronic hardware. An exemplary BCH Encode function is the bchenc/bchdec function or encoder made available in connection with software offered under the MATLAB® trademark of MathWorks, Inc. as of the priority date of this disclosure.

In one or more embodiments, the responses ($r_x$) of the PUF circuit of the queried device are stored in a series of records in the database allocated to the queried device. Each record includes data fields storing the following values: <$N_i$, $r_i$, $p_t$, $ID_t$, $Help_i$>. In a preferred embodiment, each of $N_i$, $r_i$ and $p_t$ is m-bits long, $ID_t$ is q-bits long, and $Help_i$ is n-bits long.

One of ordinary skill will appreciate that the population of data elements in each record may vary without departing from the spirit of the present invention. For example, $ID_t$ may be omitted where the querying device database otherwise segregates records corresponding to each queried device. For another example, $Help_i$ may be omitted wherever the querying device does not implement corresponding error correction protocols.

Moreover, in one or more embodiments the database records for each queried device may be encrypted prior to storage. For example, the querying device may generate an encryption key ($K_s$) at least in part by generating a random challenge ($C_s$) and passing it through the weakPUF of the querying device. The encryption key ($K_s$) may be used for encrypting the records ($Encrypt_{K_s}$<$N_i$, $r_i$, $p_t$, $ID_t$, $Help_i$>) to generate $Enc_{i,x}$, which may be stored as noted above. Moreover, the querying device may store the random challenge ($C_s$) in NVM for use in decrypting the records during authentication, as discussed in more detail below.

It should be noted that, even if an attacker hacks the querying device NVM to obtain the random challenge ($C_s$), the attacker will preferably be unable to generate the encryption key ($K_s$) required to decrypt the database record(s). More particularly, in one or more embodiments, the attacker does not have or have access to the weakPUF of the querying device, which, again, is used in one or more embodiments to generate the encryption key ($K_s$) from the random challenge ($C_s$). That is, even if the attacker employs the same circuitry of weakPUF as that employed by the querying device, the attacker's version of that circuitry will not generate the same response (i.e., key) because of unclonability property of PUF circuits. This permits the querying device, in one or more embodiments, to store the random challenge ($C_s$) relatively unsecurely, and to avoid storing the encryption key ($K_s$) in favor of simply regenerating it during runtime, while remaining resilient to hacking attacks.

The above-referenced enrollment steps may be repeated for each of the queried devices to be enrolled by the querying device. Moreover, as part of the enrollment process in embodiments of the present invention that establish public and private encryption keys, the queried devices and the querying device may agree upon and/or store public domain parameters $\{p, a, b, G, n, h\}$ of the elliptic curve described in more detail below. p defines the finite field over which the elliptic curve is defined, a, b are the curve parameters, G is the generator point, and n and h are the order and cofactor of G, respectively.

One of ordinary skill will also appreciate that the enrollment process outlined above preferably occurs in a trusted environment in which communications along communication links are considered secure from interception. The following description of an authentication event, however, may occur in an environment in which it is expected that at least the querying device may be subject to breach and/or that the communications between querying and queried device(s) may be intercepted.

Authentication

The steps set out herein generally correspond to the flowchart illustrated in FIG. 4B.

Figure 5B:
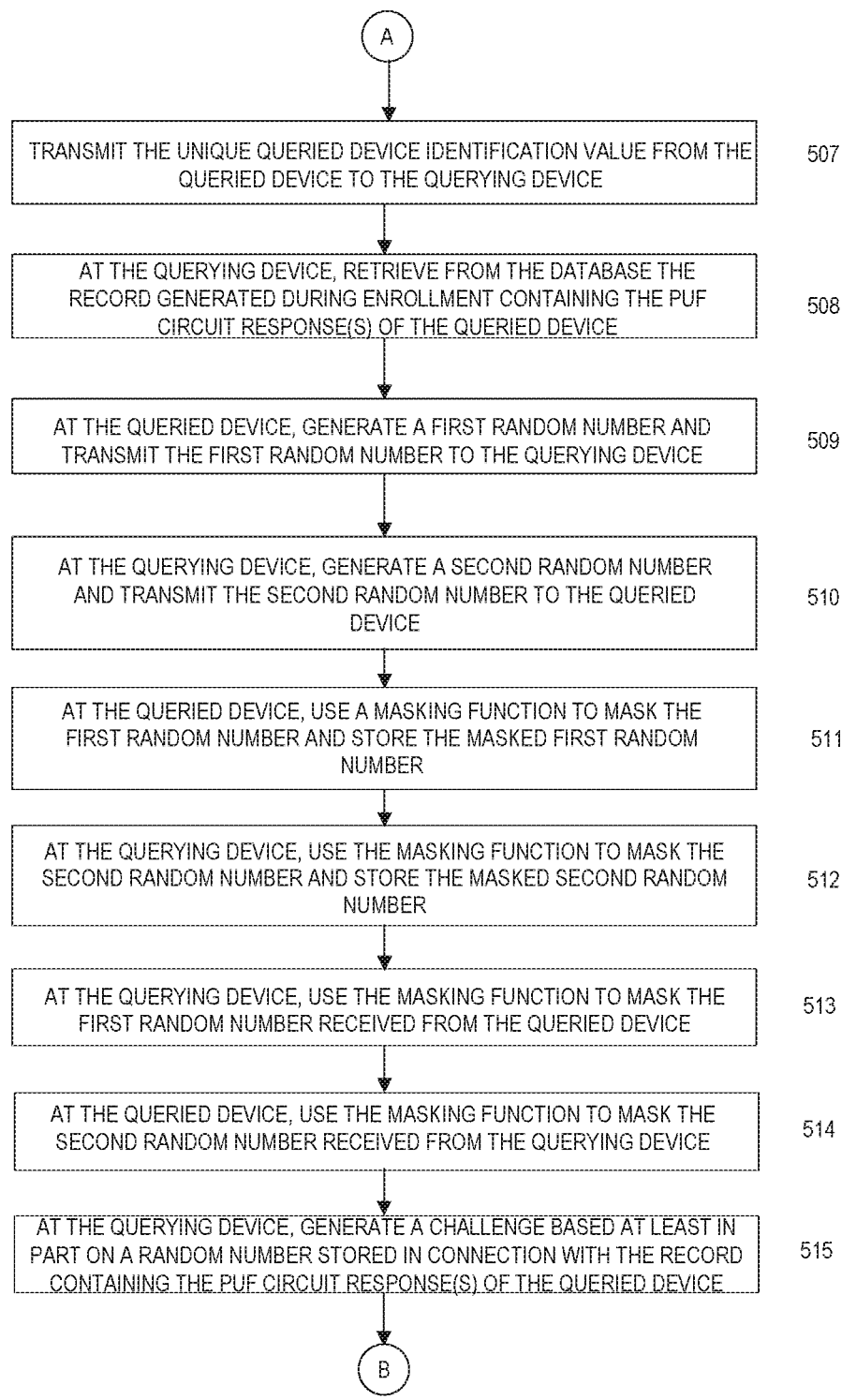

In connection with an authentication event, and referring to step 507 of FIG. 5B, the queried device may transmit its unique queried device identification value to the querying device. In embodiments in which authentication operations correspond to an effort to enable communication between two different queried devices, a first queried device may transmit its unique queried device identification value ($ID_A$) with the unique queried device identification value of the other queried device ($ID_B$). In one or more embodiments, the two values may be concatenated ($ID_A \| ID_B$).

In an embodiment—such as where the queried device comprises an RFID tag or the like—the queried device may be prompted to transmit the identification value by the querying device based on proximity. In another embodiment—such as where the queried device is seeking data from the querying device or a device protected by the querying device—the communication may be initiated by the queried device as a means of beginning the process of retrieving such data. One of ordinary skill will appreciate that a wide variety of events could trigger an authentication event or cycle within the scope of the present invention.

Referring to step 508 of FIG. 5B, the querying device retrieves from the database a random one of the entries or records generated during enrollment for the queried device. In one or more embodiments, $ID_A$ received from the queried device is used to identify the location in the database dedicated to the queried device. Further, in one or more embodiments in which the random entry is encrypted during enrollment, the querying device may additionally retrieve $C_s$ from its NVM, regenerate $K_s$, and decrypt the encrypted random entry. The entry or record, as noted above, may include the following data elements, denoted with respect specifically to the first queried device or device "A": $<N_A, r_A, p_A, ID_A, Help_A>$. The validity of the record may be confirmed by comparing the $ID_A$ received from the queried device against the instance of that data element retrieved from the database as part of the record.

Referring to step 509 of FIG. 5B, the queried device may generate a random number and transmit the random number to the querying device. In one or more embodiments, the random number ($n_A$) is an m-bit random number generated by the TRNG of the queried device.

Further, in one or more embodiments, the queried device may calculate a Hamming weight (HW) for the random number ($n_A$). The Hamming weight may be checked against one or more thresholds to ensure its validity. For example, if the random number ($n_A$) has a HW which does not satisfy a lower bound, Li, that random number ($n_A$) is discarded and a new one is generated. This cycle may be repeated until an acceptable random number ($n_A$) is generated. It should be noted that $\tau_2$ represents the number of zeros and is equal to ($1-\tau_1$). For an ideal TRNG circuit with high bit entropy, P(X)=0.5, where X=0 or X=1. We define $\tau_1$ and $\tau_2$ as the range of values that the function HW($n_A$) can take.

Referring to step 510 of FIG. 5B, the querying device may generate a random number and transmit the random number to the queried device. In one or more embodiments, the random number ($n_{S1}$) is an m-bit random number generated by the TRNG of the querying device.

Referring to step 511 of FIG. 5B, the queried device may, utilizing a masking function, mask the random number it generated and at least temporarily store same on the queried device NVM. In one or more embodiments, the queried device may use random number ($n_A$) as input to its $PRNG_1$ to generate a set of m integers $k_{A1}$. The random number ($n_A$) and set of m integers ($k_{A1}$) may be used as input to the MASK function to generate the masked random number ($n_{AM}$).

Referring to step 512 of FIG. 5B, the querying device may, utilizing a masking function, mask the random number it generated and at least temporarily store same in the database. In one or more embodiments, the querying device may use random number ($n_{S1}$) as input to its $PRNG_1$ to generate a set of m integers ($k_{A2}$). The random number ($n_{S1}$) and set of m integers ($k_{A2}$) may be used as input to the MASK function to generate the masked random number ($n_{S1M}$).

In one or more embodiments, the querying device may first configure its $PRNG_1$ for generation of the set of m integers ($k_{A2}$). More particularly, the querying device may use the unique polynomial ($p_A$) retrieved for the queried device in step 508 to configure its $PRNG_1$ for generation of the set of m integers ($k_{A2}$).

Referring to step 513 of FIG. 5B, the querying device may, utilizing the masking function, mask the random number received from the queried device. In one or more embodiments, in accordance with the preceding description, the querying device may use random number ($n_A$) received from the queried device as input to its $PRNG_1$ to generate the set of m integers ($k_{A1}$). The random number ($n_A$) and set of m integers ($k_{A1}$) may be used as input to the MASK function to generate the querying device's instance of the masked random number ($n_{AM}$).

In one or more embodiments, the querying device may also check the Hamming weight of the random number ($n_A$) received from the queried device to ensure the threshold(s) are met in accordance with the description set out above. If not, the querying device may terminate the authentication procedures.

Referring to step 514 of FIG. 5B, the queried device may, utilizing the masking function, mask the random number received from the querying device. In one or more embodiments, in accordance with the preceding description, the queried device may use the random number ($n_{S1}$) received from the querying device as input to its $PRNG_1$ to generate the set of m integers ($k_{A2}$). The random number ($n_{S1}$) and set of m integers ($k_{A2}$) may be used as input to the MASK function to generate the queried device's instance of the masked random number ($n_{S1M}$).

In one or more embodiments, the queried device may also check the Hamming weight of the random number ($n_{S1}$) received from the querying device to ensure the threshold(s) are met in accordance with the description set out above. If not, the queried device may terminate the authentication procedures.

Upon completion of the authentication steps outlined above, each of the queried and querying devices possesses four (4) m-bit random numbers, namely original and masked versions of its own random number (for the first and second queried devices, respectively, $n_A$, $n_{AM}$ and $n_{S1}$, $n_{S1M}$) as well as original and masked versions of the random number received from the other (for the first and second queried devices, respectively, $n_{S1}$, $n_{S1M}$ and $n_A$, $n_{AM}$). Moreover, it should be noted that, in preferred embodiments, to this point in the authentication protocol the only information exchanged between queried and querying devices (presumably over insecure communication channels) has been the original random numbers ($n_A$, $n_{S1}$).

Referring to step 515 of FIG. 5B, the querying device may generate a challenge based at least in part on a random number retrieved from the database in the record corresponding to the queried device. In one or more embodiments, the challenge ($c_A$) is generated using the random number ($N_A$) retrieved from the database record in step 508. More particularly, the random number ($N_A$) may be used as input to the querying device's $PRNG_1$ (configured specifically for the queried device as outlined above) to generate the challenge ($c_A$).

Figure 5C:
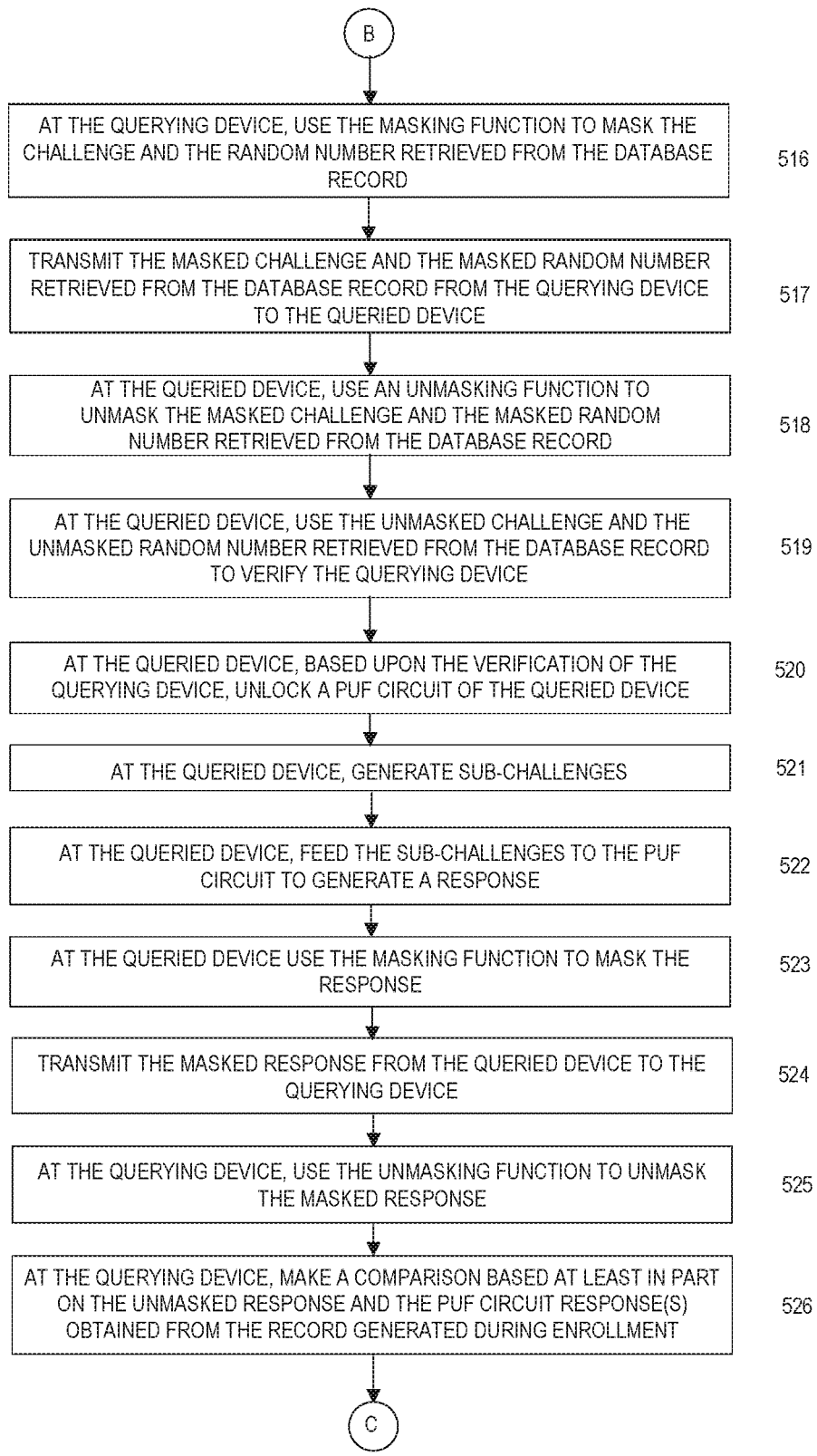

Referring to step 516 of FIG. 5C, the querying device may, utilizing the masking function, mask the challenge along with the random number retrieved from the database in the record corresponding to the queried device. In one or more embodiments, the masked challenge ($c_{AM}$) and masked random number ($N_{AM}$) are concatenated ($N_{AM}\|c_{AM}$).

In one or more embodiments, the querying device may use the masked version of the random number received from the queried device ($n_{AM}$) as input to its $PRNG_1$ to generate a set of m integers ($k_{A3}$). The challenge ($c_A$) and set of m integers ($k_{A3}$) may be used as input to the MASK function to generate the masked challenge ($c_{AM}$). Similarly, the random number retrieved from the database in the record corresponding to the queried device ($N_A$) and the set of m integers ($k_{A3}$) may be used as input to the MASK function to generate the masked database record random number (Nm).

Referring to step 517 of FIG. 5C, the masked challenge and masked database record random number are transmitted to the queried device. As noted above, the masked challenge and masked database record random number may be transmitted in concatenated format ($N_{AM}\|c_{AM}$).

Referring to step 518 of FIG. 5C, the queried device utilizes an unmasking function to unmask the masked challenge and masked database record random number received from the querying device.

In accordance with the querying device operations outlined above, the queried device may perform the unmasking operation of step 518 using the masked version of the random number it generated ($n_{AM}$) as input to its $PRNG_1$ to generate the set of m integers ($k_{A3}$). The masked version of the challenge ($c_{AM}$) and set of m integers ($k_{A3}$) may be used as input to the UNMASK function to generate the unmasked challenge ($c_A$). Similarly, the masked database record random number received from the querying device ($N_{AM}$) and the set of m integers ($k_{A3}$) may be used as input to the UNMASK function to generate the unmasked database record random number ($N_A$).

Referring to step 519 of FIG. 5C, the unmasked versions of the challenge and database record random number received from the querying device are utilized to verify the identity of the querying device. In one or more embodiments, the queried device uses the unmasked version of the database record random number ($N_A$) received from the querying device as input to its $PRNG_1$ to generate a queried device challenge ($c_A'$). The unmasked version of the challenge ($c_A$) received from the querying device may be compared against the queried device challenge ($c_A'$). If a match is found, the querying device is authenticated to the queried device. If a match is not found, the queried device may terminate the authentication event.

Referring to step 520 of FIG. 5C, upon verification of the querying device, the queried device may unlock its PUF circuit. In one or more embodiments, this is achieved using control logic of the queried device.

Referring to step 521 of FIG. 5C, the queried device may generate sub-challenges. In one or more embodiments, sub-challenges (<c>) are generated using the challenge ($c_A$) as input to the $PRNG_2$ of the queried device.

Referring to step 522 of FIG. 5C, the queried device may feed the sub-challenges it generated to its PUF circuit to generate a response. In one or more embodiments, the sub-challenges <c> are input to the PUF circuit to generate the response, and the response is considered as a noisy response ($r_{noisy}$).

Referring to step 523 of FIG. 5C, the queried device may, utilizing the masking function, mask the response. In one or more embodiments, the noisy response ($r_{noisy}$) is XORed in connection with being masked. More particularly, the queried device may use the querying device's masked random number ($n_{S1M}$) as input to XOR the noisy response ($r_{noisy}$). Moreover, in one or more embodiments, the queried device may use the querying device's masked random number ($n_{S1M}$) as input to the queried device's $PRNG_1$ to generate a set of m integers ($k_{A4}$). The set of integers ($k_{A4}$) and the XORed noisy response ($r_{noisy} \oplus n_{S1M}$) may be used as input to the MASK function to generate the masked noisy response ($r_{mask}$).

Referring to step 524 of FIG. 5C, the queried device may transmit the masked response to the querying device.

Referring to step 525 of FIG. 5C, the querying device may, utilizing an unmasking function, unmask the masked response received from the queried device. In one or more embodiments, the querying device unmasks the masked noisy response ($r_{mask}$) in part by using the querying device's instance of its masked random number ($n_{S1M}$) as input to the querying device's $PRNG_1$ to generate the set of m integers ($k_{A4}$). Further, the querying device may use the set of integers ($k_{A4}$) and the querying device's instance of its masked random number ($n_{S1M}$) to XOR and UNMASK, outputting the noisy response ($r_{noisy}$).

Referring to step 526 of FIG. 5C, the querying device may compare the unmasked response against the PUF circuit response generated during enrollment and retrieved by the querying device as part of the database record to authenticate the queried device. In one or more embodiments, the querying device corrects the noisy response ($r_{noisy}$) using the helper data ($Help_A$) retrieved with the database record in step 508 to generate a corrected response ($r_{corrected}$). The querying device then compares the corrected response ($r_{corrected}$)

to the PUF circuit response generated during enrollment and retrieved as part of the database record ($r_A$). If the corrected response ($r_{corrected}$) matches the enrollment PUF circuit response ($r_A$), the queried device is authenticated to the querying device. If no match is found, the authentication event may be terminated.

In an embodiment, completion of the authentication cycle leads directly to a permitted act authorized by the querying device. For instance, the querying device may, based upon completed authentication, signal proper authentication to an actuator that unlocks a door, provide access to a database to the queried device, transmit a request received from the queried device to another computing device as an authenticated message, or otherwise act in favor of the queried device as a result of the proper authentication. One of ordinary skill will appreciate that such a permitted act may be a single action (such as unlocking a door), may comprise permitting access for a limited period of time (such as where access to a database is provided for a limited period of time) or may be otherwise configured within the scope of the present invention.

The above-referenced authentication steps may be repeated for each of the queried devices to be authenticated by the querying device.

Key Establishment for Multiple Queried Devices

In embodiments in which it is desirable to establish encryption keys for secure communications between multiple of the queried devices, the querying device (or another verifier device) may validate the authenticity of the multiple devices using their respective PUFs. Each respective PUF may act as a root-of-trust inside the device, as described in more detail below. The steps set out herein generally correspond to the flowchart illustrated in FIG. 4C.

Figure 5D:
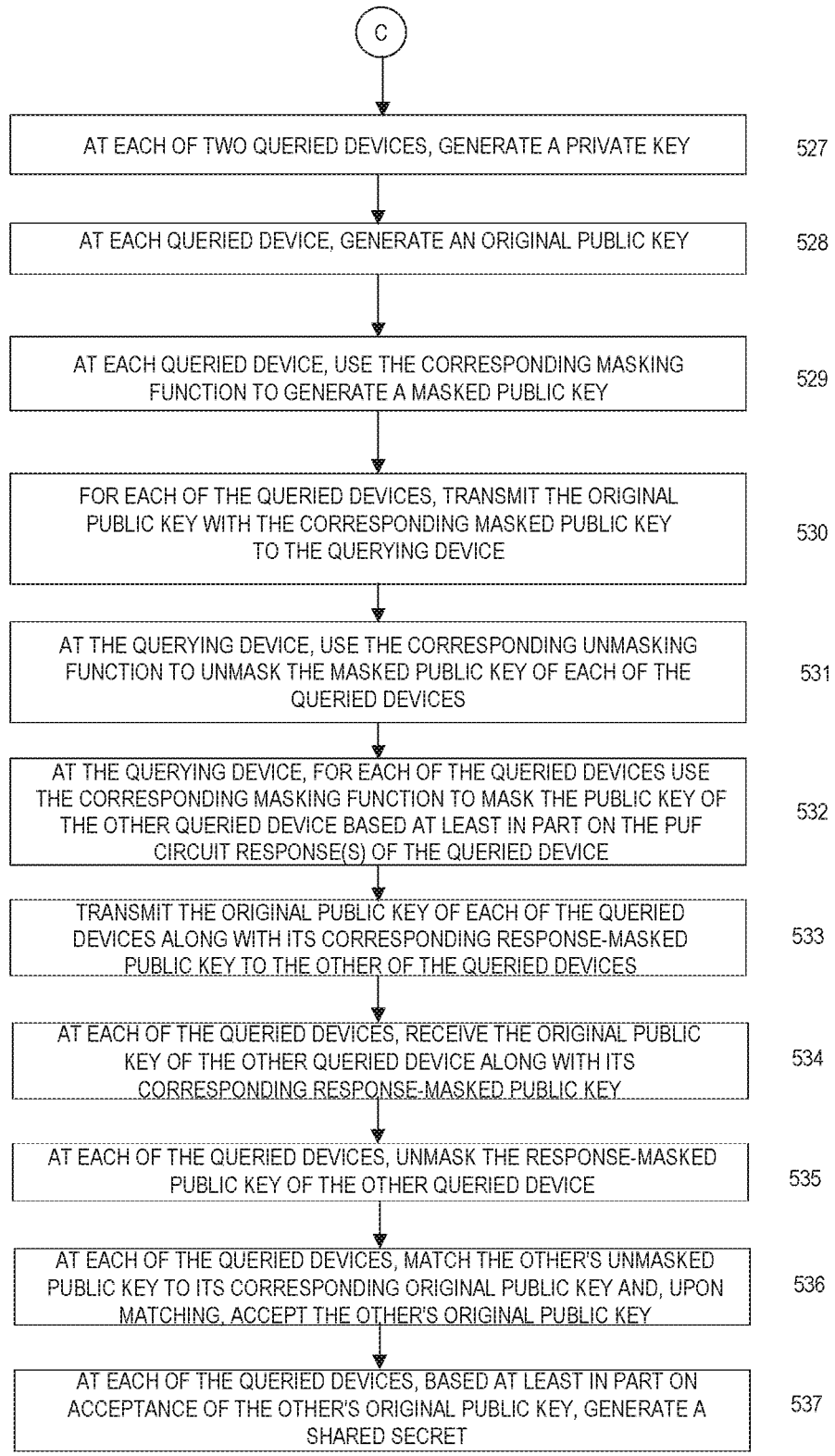

Referring to step 527 of FIG. 5D, the first queried device may generate a private key. In one or more embodiments, the first queried device will use its TRNG or a software based random number generator to generate a random number that serves as the private key (a) for the first queried device.

Referring to step 528 of FIG. 5D, the first queried device may also generate a public key. In one or more embodiments, elliptic curve point operations, relying on the public domain parameters {p, a, b, G, n, h} discussed in connection with enrollment above, are utilized to generate the public key ($A_{pub}$). Elliptic curve point operations are discussed in more detail below.

Referring to step 529 of FIG. 5D, the first queried device may, utilizing the masking function, mask the public key. In one or more embodiments, the first queried device may use its own noisy response ($r_{noisy}$) generated during the most recent authentication cycle as input to the first queried device's $PRNG_1$ to generate a set of m integers ($k_{A5}$). The set of integers ($k_{A5}$) and the public key ($A_{pub}$) may be used as input to the MASK function to generate the masked public key ($A_{pub}^*$).

Referring to step 530 of FIG. 5D, the first queried device may transmit the original public key and the masked public key to the querying device. In one or more embodiments, the original public key ($A_{pub}$) and the masked public key ($A_{pub}^*$) are concatenated ($A_{pub}\|A_{pub}^*$) for transmission to the querying device.

Steps 527-530 may be repeated by the second queried device, such that the second device's original public key and masked public key are also transmitted to the querying device. In one or more embodiments, the concatenated version ($B_{pub}\|B_{pub}^*$) is received by the querying device.

Referring to step 531 of FIG. 5D, the querying device may, utilizing a corresponding unmasking function, unmask each of the masked public keys of the first and second queried devices. In one or more embodiments, the querying device uses the noisy response of the first queried device ($r_{noisy}$)—received in masked format from the first queried device and subsequently unmasked in connection with the most recent authentication cycle (described above)—as input to the $PRNG_1$ corresponding to the first queried device (i.e., configured according to the primitive polynomial unique to the first queried device) to generate the set of m integers ($k_{A5}$). Further, the querying device uses the noisy response of the second queried device—received in masked format from the second queried device and subsequently unmasked in connection with its most recent authentication cycle (described above)—as input to the $PRNG_1$ unique to the second queried device to generate a set of m integers ($k_{B5}$). Each of the respective sets of integers ($k_{A5}$, $k_{B5}$) and masked public keys ($A_{pub}^*B_{pub}^*$) are used as input to the corresponding UNMASK function to generate unmasked public keys ($A_{pub}'$, $B_{pub}'$).

It should be noted that, in one or more embodiments, only the querying device can retrieve the unique noisy responses for each of the first and second queried devices, and that the first and second queried devices do not know each other's noisy responses because of the PUFs' uniqueness property.

In one or more embodiments, the querying device also compares the unmasked public keys ($A_{pub}'$, $B_{pub}'$) against their respective original public keys received from the queried devices ($A_{pub}$, $B_{pub}$). If matches are found, the first and second queried devices are verified and their public keys are accepted. If matches are not found, the public and private encryption key generation processes may be terminated.

Referring to step 532 of FIG. 5D, the querying device may, utilizing a masking function and for each of the queried devices, mask the public key of the queried device based at least in part on the most recent PUF circuit response received from the other queried device. In one or more embodiments, the original public key of the second queried device ($B_{pub}$) and the set of m integers corresponding to the first queried device ($k_{A5}$)— again, the first queried device's set of integers ($k_{A5}$) having been generated using the most recent noisy response ($r_{noisy}$) from the first queried device— may be used as input to the MASK function corresponding to the first queried device to generate a masked public key of the second queried device ($B_{SM}$).

Likewise, the original public key of the first queried device ($A_{pub}$) and the set of m integers corresponding to the second queried device ($k_{B5}$)— again, the second queried device's set of integers ($k_{B5}$) having been generated using the most recent noisy response ($r_{noisy}$) from the second queried device—may be used as input to the MASK function corresponding to the second queried device to generate a masked public key of the first queried device ($A_{SM}$).

Referring to step 533 of FIG. 5D, the response-masked public key of each of the queried devices is transmitted, along with its corresponding original public key, to the other of the queried devices. In one or more embodiments, the response-masked public key and original public key of the second queried device are concatenated ($B_{SM}\|B_{pub}$) for transmission to the first queried device, and the response-masked public key and original public key of the first queried device are concatenated ($A_{SM}\|A_{pub}$) for transmission to the second queried device.

Referring to step 534 of FIG. 5D, each of the queried devices may receive the other queried device's original public key and response-masked public key.

Referring to step 535 of FIG. 5D, each of the queried devices may unmask, using an unmasking function, the response-masked public key of the other queried device. In one or more embodiments, the first queried device uses the set of integers ($k_{A5}$) and the response-masked public key of the second queried device ($B_{SM}$) as input to the UNMASK function to generate the second queried device's unmasked public key ($B_S$). Likewise, the second queried device uses the set of integers ($k_{B5}$) and the response-masked public key of the first queried device ($A_{SM}$) as input to the UNMASK function to generate the first queried device's unmasked public key ($A_S$).

Referring to step 536 of FIG. 5D, each of the queried devices may match the other queried device's original public key to its unmasked public key and, upon finding a match, accept the public key of the other queried device. In one or more embodiments, the first queried device may compare the second queried device's unmasked and original public keys ($B_S$ and $B_{pub}$) and, if a match is found, accept the public key of the second queried device. Likewise, the second queried device may compare the first queried device's unmasked and original public keys ($A_S$ and $A_{pub}$) and, if a match is found, accept the public key of the first queried device.

Referring to step 537 of FIG. 5D, upon acceptance of the other queried device's public key, each of the queried devices may generate a shared secret. In one or more embodiments, the shared secret (P) is generated based at least in part on the other queried device's public key and comprises a piece of data known only to the queried devices. In one or more embodiments, for example, $P=a \cdot B_{pub}$ and $P=\beta \cdot A_{pub}$ respectively for the first and second queried devices.

The shared secret (P) may work as a key for symmetric cryptosystem communications, and may be used in connection with a variety of encryption schemes to generate encrypted and secure messages between the queried devices. The exact details of the encryption are not set forth herein. However, in an example, the first and second queried devices may use an x-coordinate of the shared secret P as a key and discard a y-coordinate. To prevent usage of a biased key, the first and second queried devices may hash the x-coordinate and use the hashed output as a key to an AES-based symmetric encryption scheme.

It should be noted that, in one or more embodiments, the encryption keys introduced herein may be refreshed periodically (e.g., after expiration of one or more pre-determined timeframes following establishment) to provide enhanced security. Moreover, in one or more embodiments, with each authentication cycle one or more of the encryption key(s) are generated/established again. It should also be noted that, even without re-authentication, the encryption key(s) may be refreshed periodically.

Public Key Operations

The proposed scheme outlined above uses Elliptic Curve Cryptography (ECC) for public key operations. ECC uses considerably smaller key lengths compared to the more common RSA, while providing the same level of security. For example, a 160-bit ECC provides the same level of security as a 1024-bit RSA. This smaller key length in ECC makes it an attractive alternative over the RSA.

An elliptic curve $E_{p(a,b)}$ is defined over a finite field F and consists of all the points which satisfy the equation $y^2=x^3+ax+b$, where a and b are two constants that satisfy the condition $4a^3+27b^2 \neq 0$. The base point P of $E_p(a,b)$ has a prime order q. The security of ECC relies on two computationally hard problems: Elliptic Curve Discrete Logarithm Problem (ECDLP) and Elliptic Curve Diffie-Hellman Problem (ECDHP).

Turning first to ECDLP, suppose E is an elliptic curve defined over a finite field F and it contains a point L: $L \in E(F)$. Suppose a point M is a multiple of L, then by definition, $\exists \alpha | \alpha \in F$ such that $M=\alpha \cdot L$. ECDLP is the computation of a given the points M and L. ECDLP is a computationally hard problem as no polynomial time algorithm exists that can compute $\alpha$.

Turning second to ECDHP, given an elliptic curve E over a finite field F, a generator point $G \in E(F)$, two points $P=\beta \cdot G$ and $Q=\gamma \cdot G$, such that $\beta$, $\gamma \in F^*$ are two unknowns, then ECDHP involves calculating the point $\beta \cdot \gamma \cdot G$, which is a computationally hard problem.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

We claim:

1. A computer-implemented method for authentication enrollment for and authentication of a queried device having a queried memory element, a queried processing element, a queried communication element, and an electrical circuit configured to output electrical signals indicative of a physically unclonable function (PUF) of the queried device, the method comprising:

performing the authentication enrollment, including by—
storing a unique identification value at the queried device;
generating a primitive polynomial unique to the queried device;
generating a configuration file based at least in part on the unique primitive polynomial, the configuration file comprising a first pseudo-random number generator configured based on the unique primitive polynomial;
programming the queried device for authentication based at least in part on the configuration file including by storing the first pseudo-random number generator in non-volatile memory of the queried device;

generating a set of random numbers at the querying device by a first true random number generator;

submitting a challenge corresponding to each of the set of random numbers to the electrical circuit of the queried device to generate a PUF response, the challenges being based at least in part on output generated at the querying device by the first pseudo-random number generator using the set of random numbers as seeds;

storing the PUF response in a queried device database record accessible to a querying device;

performing the authentication of the queried device, including by— transmitting the unique identification value from the queried device to the querying device;

via the querying device, retrieving the queried device database record;

at the queried device, generating a first random number and transmitting the first random number to the querying device;

at the querying device, generating a second random number and transmitting the second random number to the queried device;

at the queried device, using a masking function on the first random number to generate a masked first random number;

at the querying device, using the masking function on the second random number to generate a masked second random number;

at the querying device, using the masking function, masking the first random number received from the queried device;

at the queried device, using the masking function, masking the second random number received from the querying device;

at the querying device, generating an authentication challenge based at least in part on a retrieved record random number stored in connection with the retrieved queried device database record;

at the querying device, using the masking function, masking the authentication challenge and the retrieved record random number;

transmitting the masked challenge and the masked retrieved record random number from the querying device to the queried device;

at the queried device, using an unmasking function corresponding to the masking function to unmask the masked challenge;

at the queried device, using the unmasking function to unmask the masked retrieved record random number;

at the queried device, using the unmasked challenge and the unmasked random number to verify the querying device;

at the queried device, based on the verification of the querying device, unlocking the electrical circuit of the queried device;

at the queried device, generating a plurality of sub-challenges;

at the queried device, feeding the plurality of sub-challenges to the electrical circuit of the queried device to generate an authentication response;

at the queried device, using the masking function, masking the authentication response;

transmitting the masked response from the queried device to the querying device;

at the querying device, using the unmasking function, unmasking the masked response; and at the querying device, making a comparison based at least in part on the unmasked response and the PUF response from the retrieved queried device database record to authenticate the queried device to the querying device.

2. The computer-implemented method of claim 1— the queried device and the querying device being in electronic communication via one or more secured communication links, the unique identification value and the set of random numbers being transmitted from the querying device to the queried device over the one or more secured communication links, the PUF response being transmitted from the queried device to the querying device over the one or more secured communication links.

3. The computer-implemented method of claim 1, further comprising— at the querying device, generating helper data based at least in part on the PUF response of the queried device, wherein the database record includes, for each of the set of random numbers, the random number, the corresponding PUF response, the unique primitive polynomial, the unique identification value, and the helper data.

4. The computer-implemented method of claim 1— the queried device and the querying device being in electronic communication via one or more unsecured communication links, the second random number, the masked challenge and the masked retrieved record random number being transmitted from the querying device to the queried device over the one or more unsecured communication links, the unique identification value, the first random number and the masked response being transmitted from the queried device to the querying device over the one or more unsecured communication links.

5. The computer-implemented method of claim 1, the retrieved record being encrypted upon retrieval, further comprising— retrieving a random challenge from non-volatile memory of the querying device, submitting the random challenge to a weak physically unclonable function of the querying device to generate a response comprising an encryption key, decrypting the retrieved record using the encryption key.

6. The computer-implemented method of claim 1— the querying device having the first pseudo-random number generator stored on non-volatile memory, execution of the masking and unmasking functions relying on output from the first pseudo-random number generator.

7. The computer-implemented method of claim 6, further comprising— following receipt of the unique identification value and retrieval of the queried device database record, retrieving the unique primitive polynomial from the queried device database record, using the unique primitive polynomial to configure the first pseudo-random number generator at the querying device.

8. The computer-implemented method of claim 6— the first pseudo-random number generator being based on a linear feedback shift register.

9. The computer-implemented method of claim 6—
the plurality of sub-challenges being generated at the queried device by a second pseudo-random number generator using the authentication challenge as a seed.

10. The computer-implemented method of claim 1—
the unmasked response comprising a noisy response,
the comparison to authenticate the queried device to the querying device including retrieving helper data from the retrieved queried device database record, generating a corrected response, and comparing the corrected response to the PUF response from the retrieved queried device database record.

11. The computer-implemented method of claim 1, wherein—
generating the masked response includes taking the masked second random number as input to XOR the authentication response.

12. The computer-implemented method of claim 1, wherein—
generating the first and second random numbers includes calculating the Hamming weight of a true random number generator output, comparing the Hamming weight against at least one threshold, and, if the threshold is not met, replacing the output with an additional true random number generator output.

* * * * *